Figure 1:
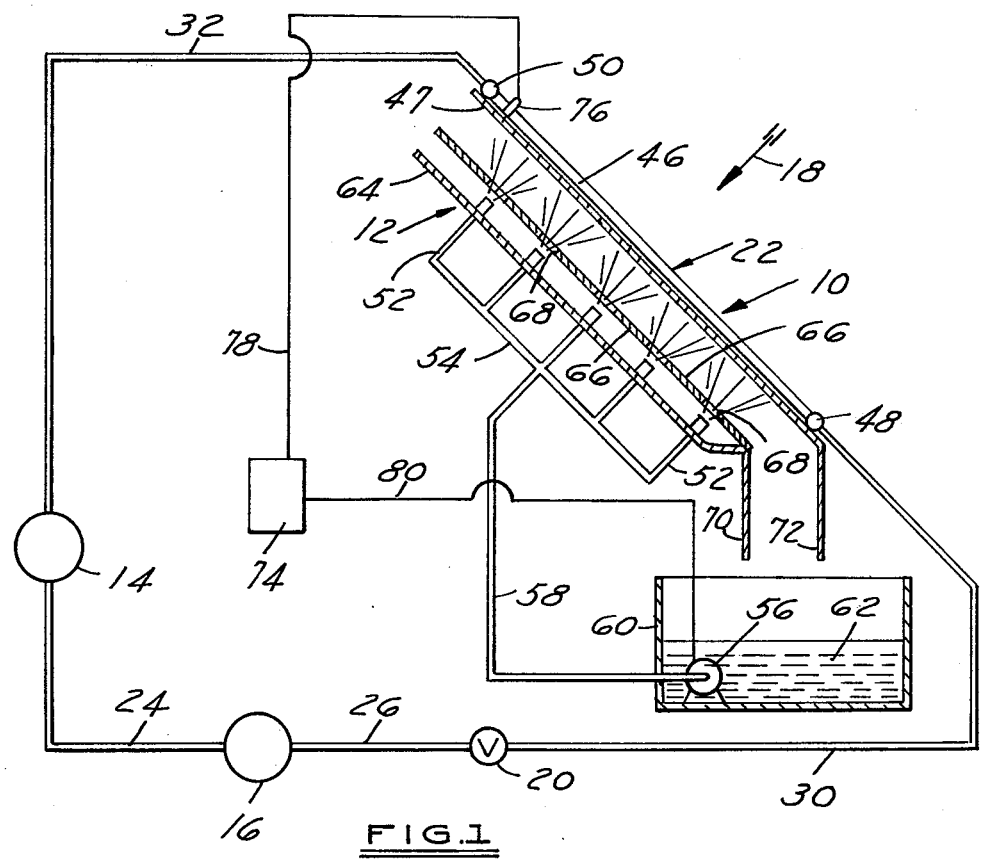

United States Patent

Bottum

[11] 4,142,678
[45] Mar. 6, 1979

[54] COMBINED HEAT PUMP SYSTEM AND ICE MAKING SYSTEM

[76] Inventor: Edward W. Bottum, 9357 Spencer Rd., Brighton, Mich. 48116

[21] Appl. No.: 814,458

[22] Filed: Jul. 11, 1977

[51] Int. Cl.² ........................................... F25B 29/00
[52] U.S. Cl. ....................................... 237/2 B; 62/2; 62/238; 62/347
[58] Field of Search ................... 62/2, 238, 347; 237/2 B

[56] References Cited
U.S. PATENT DOCUMENTS 3,722,227   3/1973   Esser et al. ........................ 62/347
3,991,938   11/1976  Ramey ............................... 62/238 E Primary Examiner—William E. Wayner
Attorney, Agent, or Firm—Whittemore, Hulbert & Belknap

[57] ABSTRACT

The combined heat pump system and ice making system includes a heat pump system used for normal heating purposes. The heat pump system is augmented with an ice making system wherein ice is formed on the system evaporator. This ice making improves the operational efficiency of the heat pump system during cold or sunless periods. Additionally, the resulting ice is collected and stored for use as ice.

3 Claims, 2 Drawing Figures

U.S. Patent    Mar. 6, 1979    4,142,678

COMBINED HEAT PUMP SYSTEM AND ICE MAKING SYSTEM

BACKGROUND OF THE INVENTION

In the past, heat pump systems have been utilized to collect heat from either the ambient atmosphere or sunlight. Other sources of heat energy have also been tapped, such as water reservoirs and underground heat sources.

The invention utilizes a plate which may be inclined at an angle to the sun such that it will serve as a solar collector. It may consist of a plate of any type to which tubes have been attached, or it may be some surface which is made out of metal and expanded to provide a collector surface. The top surface serves to pick up heat from the sun and heat is transferred to the inside which contains a refrigerant charge, as an evaporator in a part of a heat pump system. The underside of the plate serves as an evaporator plate for an ice making heat pump when water is sprayed upon it from below.

The advantages of such a combination plate is that when the ambient temperatures are relatively warm and heat may be picked up from the sun, such as at temperatures of 32° or above, the plate is used as a collector plate for a solar assisted heat pump. However, when the sun is obscured or during the night a drop in ambient temperature will result in a drop in suction pressure at the compressor and will cause a control to turn on a water spray at the proper time and spray water up on the under surface of the collector plate. With a proper arrangement water may also be sprayed on from above. Accordingly, due to the drop in suction pressure, freezing will now occur on the plate and ice will be formed. Thus efficiency may be maintained as in an ice making heat pump system. The collector plate can be harvested at intervals to free it from ice and the ice will simply fall free from the collector plate during the harvesting cycle. A slot can be provided at the lower end of the collector plate for ice to slide down a duct and into a storage bin in the basement or other room. Thus a very practical combination of collector and ice making evaporator is provided and controls for this system are extremely simple since the refrigerant continues to flow through the same collector plate whether the plate is being used as a solar collector or an ice making evaporator.

SUMMARY OF THE INVENTION

The combined heat pump system and ice making system includes a heat pump system having a compressor, evaporator, and condenser, all connected together in operative relationship. The evaporator comprises a plate element having at least one surface portion for absorbing sunrays and converting such rays to heat energy. Tubular structure is provided in heat exchange relationship with the plate element for conduction of heat energy from the plate element to the tubular structure. Fluid refrigerant is circulated in the heat pump system. Means are provided for deploying water on the plate element at a preselected temperature to form ice thereon.

IN THE DRAWING

Figure 2:
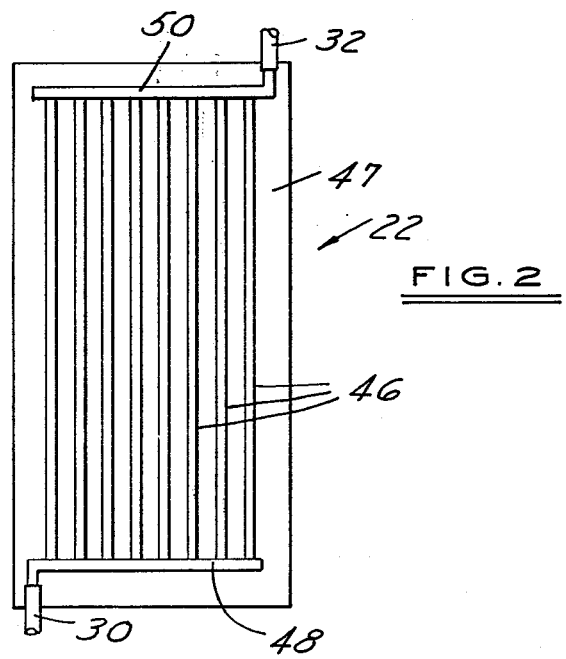

FIG. 1 is a diagrammatic view of one embodiment of the combined heat pump system and ice making system of the present invention; and FIG. 2 is a plan view of the evaporator utilized in the FIG. 1 combination.

Referring to the structure illustrated in FIGS. 1 and 2, a heat pump system 10 is used in conjunction with an ice making system 12. Each system utilizes the same evaporator structure 22.

The heat pump system 10 comprises a compressor 14, condenser 16, expansion valve 20, and evaporator 22. These structures are operatively connected together by means of conduits 24, 26, 30, 32.

A heat pump, as is well known, is essentially a refrigeration system in reverse. In a refrigeration system, the condenser is normally located outside of the space to be cooled to thereby dissipate the heat generated in the condenser to the ambient atmosphere. The evaporator is located in a position enabling the cooling effect thereof to be transmitted to the space to be cooled. In the heat pump system 10, the evaporator structure 22 acts as a heat collecting structure during relatively warm periods (such as above 32° F., for example) and absorbs heat from sunrays 18 during periods when the sun shines. This heat allows refrigerant in the evaporator 22 to expand into gaseous form. Gaseous refrigerant is drawn via conduit 32 to compressor 14 wherein it is compressed. The hot gases pass to condenser 16 via conduit 24. The compressed gases are condensed into liquid form in condenser 16, thus giving off heat. This heat is used by any desirable means to heat a building structure such as a house. The condensed liquid refrigerant passes from condenser 16 via conduit 26 through expansion valve 20 and thence back to evaporator 22 via conduit 30.

As will be noted in FIG. 2, the evaporator structure 22 comprises a plurality of spaced apart parallel tubes 46 which are connected together at their lower ends by manifold tube 48 and at their upper ends by manifold tube 50. Conduits 30, 32 are connected to the manifold tubes. The tubular structure is mounted on a metal plate 47. This plate is usually blackened in order to increase its ability to absorb sunrays. The unit is oriented at an angle with manifold 48 being below manifold 50 so that liquid refrigerant will tend to collect in the lower portion thereof so that the major portion may be flooded with liquid refrigerant and gaseous refrigerant is free to move upwardly as a result of its own vapor pressure through conduit 32 and thence to the compressor 14. It is desirable to maintain the tubes 46 in essentially the flooded condition.

Standard refrigerant fluid suitable for use in refrigeration normally fluorinated hydrocarbons, is used in the heat pump system 10. The refrigerant changes from a liquid to a gas in the evaporator structure 22.

Referring again to FIG. 1, an ice making system is also provided for use during cooler periods or during periods of no sunlight as a means for improving the efficiency of the heat system and also for forming ice which is to be used in the normal way.

As will be noted, a plurality of water nozzles 52 are provided beneath the evaporator structure 22 in spaced apart relationship. The water nozzles 52 are connected together by means of a manifold 54. The manifold 54 is connected to a water pump 56 via conduit 58. The pump 56, which is driven by an electric motor, is immersed in a reservoir 60 filled with water 62.

The nozzles 52 are supported in a plate structure 64 and are aimed at the underside of plate 47. Another plate 66 is provided between the nozzles 52 and evaporator plate 47. An opening 68 is provided in plate 66 in alignment with each of the nozzles 52 so that water may pass through plate 66 and impinge upon the under surface of evaporator plate 47. Plates 64, 47 are illustratively extended at 70, 72 to define a duct directed into the reservoir 60.

An electrical thermostatic control device 74 is connected to a temperature sensing element 76 illustratively mounted on the upper surface of plate 47 to detect the temperature thereof. The sensor 76 is connected to control 74 by lead 78. A second lead 80 extends from control device 74 to the electric motor of pump 56.

The ice making system is triggered into operation when there is no sunlight or the ambient temperature drops below a predetermined level, such as 32° F. When the sun is shining, high grade heat may be picked up by evaporator structure 22 for use by the heat pump to generate heat. However, when the sun is obscured or the temperature drops, the evaporator pressure will decrease due to lack of load. Under such conditions, sensor 76 triggers control device 74 to cause pump 56 to operate. Water is then pumped through nozzles 52 and impinges upon the underside of the evaporator plate 47. This water will freeze into a layer of ice. After a film of ice has formed, it may be harvested. For example, hot refrigerant gas may be discharged through tubes 46 to cause a short period of warmth, causing the ice to break away. The ice will fall onto plate 66 and break into small pieces and thence the ice will flow through the duct defined by extensions 70, 72 into reservoir 60 where it will be mixed with the water. The reservoir 60 may be located in a storage shed or the like. Ice may be taken therefrom as needed. Of course, not all of the water will immediately freeze; some of it will drip into reservoir 60 whereupon it will be repumped onto the under surface of plate 47.

The formation of ice on the underside of plate 47 results in heat being available for the heat pump. The heat pump system thus will operate efficiently even at low ambient temperatures and on sunless days or during the night.

What I claim as my invention is:

1. A combined heat pump system and ice making system, said heat pump system including a compressor, evaporator, and condenser, all connected together in operative relationship, said evaporator comprising a first plate element having at least one surface portion for absorbing sunrays and converting such rays to heat energy, tubular structure in heat exchange relationship with said first plate element for conduction of heat energy from the first plate element to the tubular structure, fluid refrigerant circulated in said heat pump system, and means for deploying water on said first plate element at a preselected evaporator temperature to form ice thereon, said means for deploying water on said first plate element adapted to deploy water on the underside of said first plate element with said first plate element being oriented so that one surface portion defines an underside, and a second plate element having opening means therein for passage of water provided between said means for deploying water on said first plate element whereby ice formed on the first plate element may drop downwardly onto said second plate element for transportation away from said first plate element, and storage means to receive ice which is transported on said second plate element.

2. A combined heat pump system and ice making system as in claim 1, further characterized in that said means for deploying water on said plate element comprise a plurality of spaced apart nozzles positioned to spray water onto the plate element, said nozzles being connected to a source of water under pressure.

3. A combined heat pump system and ice making system as in claim 1, further characterized in the provision of electrical control means for actuating said means for deploying water on said plate element at a preselected temperature.

* * * * *